US010999328B2

(12) United States Patent
Lango et al.

(10) Patent No.: US 10,999,328 B2
(45) Date of Patent: *May 4, 2021

(54) TAG-BASED POLICY ARCHITECTURE

(71) Applicant: VMware, Inc., Palo Alto, CA (US)

(72) Inventors: Jason A. Lango, Mountain View, CA (US); Grant Callaghan, San Jose, CA (US); Marcel Moolenaar, Mountain View, CA (US); Vinay Wagh, San Jose, CA (US); Rohan Desai, Pleasanton, CA (US); Matthew Page, Mountain View, CA (US); Gary Menezes, Sunnyvale, CA (US); Antoine Pourchet, Sunnyvale, CA (US); Ramya Olichandran, Sunnyvale, CA (US)

(73) Assignee: VMware, Inc., Palo Alto, CA (US)

( * ) Notice: Subject to any disclaimer, the term of this patent is extended or adjusted under 35 U.S.C. 154(b) by 2 days.

This patent is subject to a terminal disclaimer.

(21) Appl. No.: 16/430,344

(22) Filed: Jun. 3, 2019

(65) Prior Publication Data

US 2019/0306196 A1    Oct. 3, 2019

Related U.S. Application Data

(63) Continuation of application No. 15/661,618, filed on Jul. 27, 2017, now Pat. No. 10,356,128.

(51) Int. Cl.
*H04L 29/06* (2006.01)
*G06F 21/57* (2013.01)
(Continued)

(52) U.S. Cl.
CPC ............ *H04L 63/20* (2013.01); *G06F 21/575* (2013.01); *H04L 9/3268* (2013.01);
(Continued)

(58) Field of Classification Search
None
See application file for complete search history.

(56) References Cited

U.S. PATENT DOCUMENTS 6,938,155 B2    8/2005  D'Sa et al.
8,122,482 B2    2/2012  McGrew et al.
(Continued)

FOREIGN PATENT DOCUMENTS

WO    2014151126 A1    9/2014

OTHER PUBLICATIONS

Heinrich, Frank R. et al., A centralized approach to computer network security, National Computer Conference, 1976, pp. 85-90.

*Primary Examiner* — Maung T Lwin
(74) *Attorney, Agent, or Firm* — Patterson + Sheridan, LLP (57) ABSTRACT

A tag-based policy architecture enforces information technology (IT) policy in a virtualized computing environment using cryptographically-verifiable metadata to authenticate compute resources coupled to a computer network and to authorize access to protected resources of the network. The compute resources are illustratively virtual machine instances (VMIs) provided by a virtual data center (VDC) of the environment, whereas the protected resources are illustratively virtualized storage, network and/or other compute resources of the VDC. Each VMI includes an intermediary manager, e.g., metavisor. The tag-based policy architecture includes an infrastructure having a centralized policy decision end point (e.g., a control plane of the VDC) and distributed policy enforcement endpoints (e.g., metavisors of the VMIs) to provide end-to-end passing of the cryptographically-verifiable metadata to (i) authorize instantiation of the VMIs at the control plane, and (ii) enforce access to the virtualized resources at the metavisors.

20 Claims, 7 Drawing Sheets

(51) Int. Cl.
  *H04L 9/32* (2006.01)
  *H04L 29/08* (2006.01)
  *G06F 9/455* (2018.01)

(52) U.S. Cl.
  CPC ...... *H04L 63/0209* (2013.01); *H04L 63/0263* (2013.01); *H04L 63/0823* (2013.01); *H04L 63/10* (2013.01); *H04L 63/123* (2013.01); *H04L 67/10* (2013.01); *G06F 9/455* (2013.01)

(56) References Cited

U.S. PATENT DOCUMENTS

| | | | |
|---|---|---|---|
| 8,239,608 B1 * | 8/2012 | Ginzton | G06F 9/468 711/6 |
| 8,490,086 B1 | 7/2013 | Cook et al. | |
| 8,875,266 B2 | 10/2014 | Chambers et al. | |
| 8,972,980 B2 * | 3/2015 | Banga | G06F 9/5027 718/1 |
| 9,292,331 B2 | 3/2016 | Lango et al. | |
| 9,306,978 B2 | 4/2016 | Lango et al. | |
| 9,335,932 B2 | 5/2016 | Lango et al. | |
| 9,455,977 B1 | 9/2016 | Bailey et al. | |
| 9,491,161 B2 * | 11/2016 | Suresh | H04L 67/42 |
| 9,535,741 B1 | 1/2017 | Lango et al. | |
| 9,578,064 B2 | 2/2017 | Lango et al. | |
| 9,792,143 B1 * | 10/2017 | Potlapally | G06F 21/6218 |
| 2002/0178355 A1 | 11/2002 | D'Sa et al. | |
| 2005/0108518 A1 * | 5/2005 | Pandya | H04L 63/20 713/151 |
| 2009/0193506 A1 | 7/2009 | McGrew et al. | |
| 2013/0173900 A1 | 7/2013 | Liu | |
| 2014/0108486 A1 | 4/2014 | Borzycki et al. | |
| 2014/0259094 A1 * | 9/2014 | Narayanaswamy | H04L 47/20 726/1 |
| 2015/0012998 A1 | 1/2015 | Nellikar et al. | |
| 2015/0237031 A1 * | 8/2015 | Neuman | H04L 63/08 713/176 |
| 2016/0191413 A1 | 6/2016 | Feroz et al. | |
| 2016/0337329 A1 | 11/2016 | Sood et al. | |
| 2016/0380909 A1 | 12/2016 | Antony et al. | |
| 2017/0118173 A1 | 4/2017 | Arramreddy et al. | |

* cited by examiner

TAG-BASED POLICY ARCHITECTURE

CROSS-REFERENCE TO RELATED APPLICATION

This application claims priority to U.S. patent application Ser. No. 15/661,618, filed Jul. 27, 2017, which is hereby incorporated by reference herein in its entirety.

TECHNICAL FIELD

The present disclosure relates to virtualized computing environments and, more specifically, to a policy architecture configured to enforce policy and authorize access to protected resources of a virtualized computing environment.

BACKGROUND

Many enterprises and their computer systems utilize virtual machines provided by a virtual data center (VDC) of a virtualized computing environment. The VDC may furnish virtualized resources, such as virtualized storage resources, virtualized network resources and/or virtualized compute resources that are accessible over a computer network, such as the Internet. A prior approach to enforcing access among such resources employs a configuration based on network layer, e.g. internet protocol (IP), address-based tables organized as firewall rules and/or a link layer configuration, e.g., groups of switch ports, organized as virtual local area networks (VLANs) to apportion the computer network into segments or subnets. The address-based tables and/or VLANs provide coarse-grained access control and enforcement to the virtualized resources depending upon location on the network segment, i.e., a resource connected to the network segment may communicate with other resources connected to the segment.

Configuration of the address-based tables/VLANs is generally static; a network administrator may be employed to define (create) the firewall rules of the tables or VLANs (e.g., groups of switch ports). In addition, updates to the configuration in a dynamically changing environment may be difficult and inefficient since the tables/VLANs are not human-readable or easily accessible. Although tools are generally available to facilitate automation of the configuration and updates, such tools are generally network segment based. For example, a virtual network switch (such as VMware NSX) may be used to implement VLANs for the network segment and to copy the contents of the firewall rules among the virtualized compute resources on the network segment to keep the tables synchronized.

BRIEF DESCRIPTION OF THE DRAWINGS

The above and further advantages of the embodiments herein may be better understood by referring to the following description in conjunction with the accompanying drawings in which like reference numerals indicate identically or functionally similar elements, of which.

OVERVIEW

The embodiments described herein are directed to a tag-based policy architecture configured to enforce information technology (IT) policy in a virtualized computing environment (e.g., a cloud service provider) using cryptographically-verifiable metadata to authenticate compute resources coupled to a computer network and to authorize access to protected resources of the network. The compute resources are illustratively virtual machine instances (VMIs) provided by a virtual data center (VDC) of the environment, whereas the protected resources are illustratively virtualized storage, network and/or other compute resources (e.g., services) of the VDC. Each VMI includes an intermediary manager, e.g., a meta-hypervisor (metavisor), of a computing cell that also includes a guest operating system (OS) and associated applications. The tag-based policy architecture includes an infrastructure having a centralized policy decision endpoint (e.g., a control plane of the VDC) and distributed policy enforcement endpoints (e.g., metavisors of the VMIs) that use end-to-end passing of the cryptographically-verifiable metadata to (i) authorize instantiation of the VMIs at the control plane, and (ii) enforce access to the virtualized resources at the metavisors. To that end, the cryptographically-verifiable metadata may be embodied as token data structures (tokens) and identity documents used to authenticate the VMIs, as well as network certificates, configuration, and keys used to authorize access to the virtualized (e.g., protected) resources.

In one or more embodiments, the identity document is a JSON file that contains metadata describing a VMI (including the metavisor) and the token is a JSON web token (JWT) that is supplied to the metavisor upon boot. A private key of an asymmetric public/private key pair is used to sign the JWT at the metavisor and the associated public key of the key pair is used to authenticate the JWT signature at the control plane, e.g., via a secure (encrypted) connection request. One or more arbitrary key-value pairs (i.e., tags) may be embedded within a payload of the JWT as one or more private claims that enable attachment of IT policy to a virtualized resource, such as the metavisor, or groups of virtualized resources. The network certificate is issued by the control plane in response to verifying the identity of the metavisor of an authenticated VMI (i.e., an authenticated metavisor) running in the VDC according to the IT policy included in the JWT. The network certificate returned to the metavisor illustratively contains the JWT embedded as an extension that is used to render a policy decision at the metavisor. Groups of authenticated metavisors running in the VDC (peer groups) may be associated with various IT policies to form a network and/or data access configuration provided to each metavisor of the groups.

In one or more embodiments, the cryptographically-signed JWTs and embedded tags may be used to create the various IT policies, such as boot policy, data policy, and network policy (classes of policies), which are stored in a database repository of the control plane. Access to the virtualized resources may then be enforced at the control plane and at the metavisors in accordance with the various IT policies, so that the virtualized resources are protected. The infrastructure of the tag-based policy architecture may be configured to provide unified policy management and visibility (e.g., feedback of policy enforcement and access to resources at the metavisors) for varying classes of policy (e.g., boot policy, data policy, and network policy) to an administrator via the control plane. For example, boot policy may be employed at the control plane to enforce when and how a metavisor is allowed to boot (i.e., operate after initial authorization with the control plane) in a computing cell of a VMI, whereas data policy may be employed at the (booted) metavisors to specify the manner in which applications can access (read and/or write) data stored on volumes of the VDC according to the data access configuration. Network policy may be employed at the metavisors to control end-to-end communication between (i) endpoints and services provided by the VMIs and (ii) the metavisors using the network configuration to establish connections and/or encryption of network flows. That is, the booted metavisors provide cryptographically secure communication while enforcing authorized data access as specified in the data policy and authorized network access as specified in the network policy. Notably, the JWTs embodying the tags defining the various policies are verifiable using the included cryptographic signature and may be further secured (i.e., rendered private) by encrypting the entire JWT, so that secrets (e.g., keys) may be sent via the encrypted JWT. The unified management and visibility feature of the architecture across policy classes may permit the administrator to detect policy conflicts, such as unintended data access between differing classes of policies, that may otherwise go undetected.

In one or more embodiments, the control plane evaluates the tags of the JWTs and the identity documents with its stored IT policies to authenticate release of keys to the metavisors for secure cryptographic operations (e.g., cryptographically secure access to data and network services). Illustratively, the released keys may be transmitted within a secure (encrypted) connection response, although such keys may alternatively be transmitted via an encrypted JWT. For boot policy, the released keys may include network certificates to enable establishment of secure connections between the control plane and metavisors in order for the metavisors to obtain the network and/or data access configuration. For data policy, the released keys may include data encryption/decryption keys to enable the metavisors to encrypt (wrap/encapsulate) or decrypt (unwrap/unencapsulate) data of the volumes. Evaluation of network policy at the control plane may result in release of a network configuration (e.g., for a peer group) and one or more secret keys (e.g., an authentication key and/or an encryption key) to enable the metavisors to authenticate and/or encrypt connections to other peer metavisors of the group. In addition, the JWTs and network configuration may be employed to apportion the computer network into segments, i.e., network segmentation, so as to enable fine-grained access (e.g., per metavisor or peer group) control by the metavisors over the virtualized resources in a dynamically distributed manner.

DESCRIPTION

Figure 1:
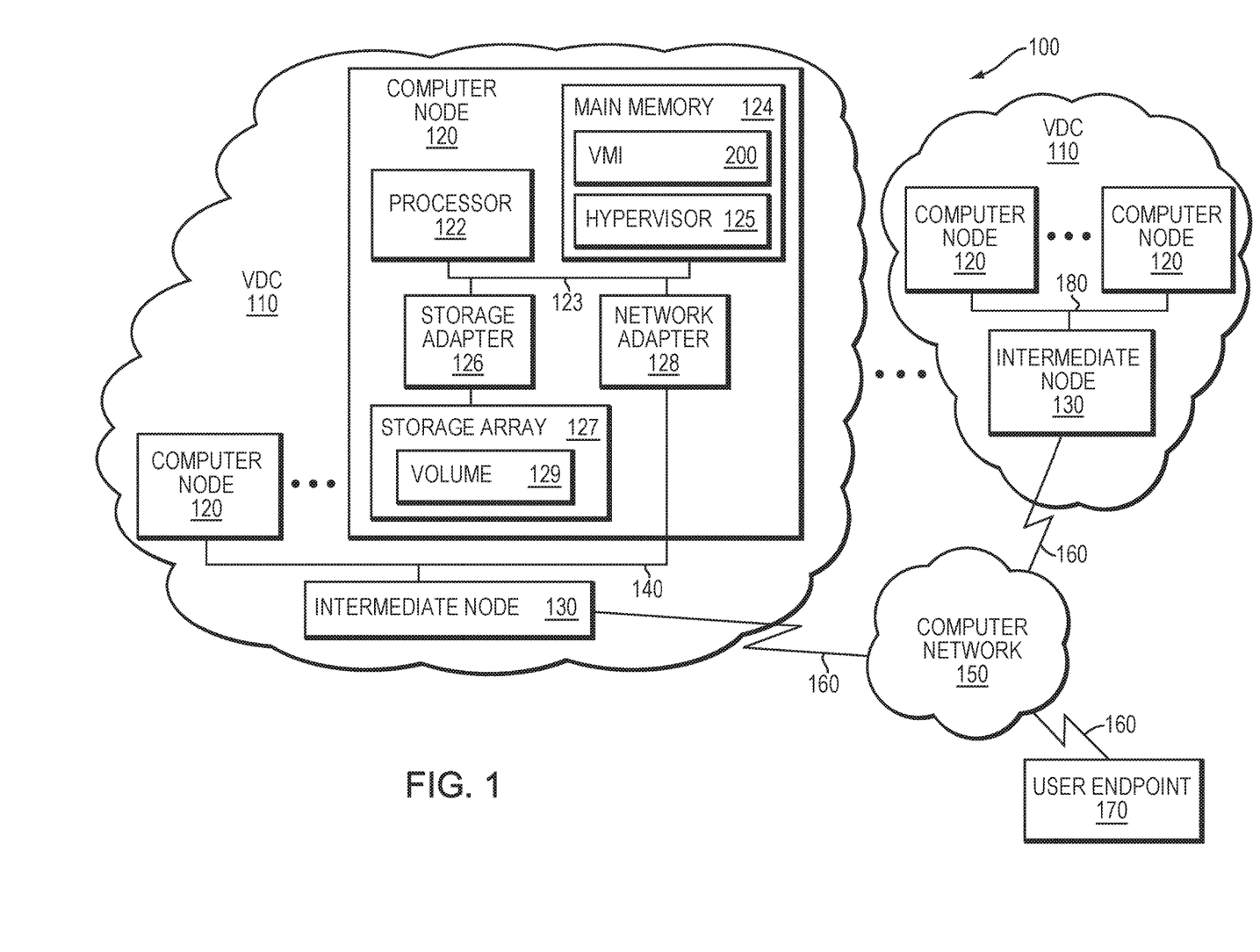
FIG. 1 is a block diagram of a virtualized computing environment.

FIG. 1 is a block diagram of a virtualized computing environment 100 that includes one or more computer nodes 120 and intermediate nodes 130 illustratively embodied as one or more virtual data centers (VDCs) 110 interconnected by a computer network 150. In some embodiments, the VDCs may be cloud service providers (CSPs) deployed as private clouds or public clouds, such as deployments from Amazon Web Services (AWS), Google Cloud Services, Microsoft Azure, or VMWare vCloud. Each VDC 110 may be configured to provide virtualized resources, such as virtual storage, network, and/or compute resources that are accessible over the computer network 150, such as the Internet. Each computer node 120 is illustratively embodied as a computer system having one or more processors 122, a main memory 124, one or more storage adapters 126, and one or more network adapters 128 coupled by an interconnect, such as a system bus 123. The storage adapter 126 may be configured to access information (e.g., data) stored as one or more volumes 129 (e.g., root and/or data volumes) on magnetic/solid state storage devices (e.g., disks or other similar media) of storage array 127. To that end, the storage adapter 126 may include input/output (I/O) interface circuitry that couples to the disks over an I/O interconnect arrangement, such as a conventional peripheral component interconnect (PCI) or serial ATA (SATA) topology.

The network adapter 128 connects the computer node 120 to other computer nodes 120 of the VDC 110 over local network segments 140 illustratively embodied as shared local area networks (LANs) or virtual LANs (VLANs). The network adapter 128 may thus be embodied as a network interface card having the mechanical, electrical and signaling circuitry needed to connect the computer node 120 to the local network segments 140. The intermediate node 130 may be embodied as a network switch, router, or virtual private network (VPN) gateway that interconnects the LAN/VLAN local segments with remote network segments 160 illustratively embodied as point-to-point links, wide area networks (WANs), and/or VPNs implemented over a public network (such as the Internet) and connect user endpoints 170 embodied as other computer nodes. Communication over the network segments 140, 160 may be effected by exchanging discrete frames or packets of data according to pre-defined protocols, such as the Transmission Control Protocol/Internet Protocol (TCP/IP) and the OpenID Connect (OIDC) protocol, although other protocols, such as the User Datagram Protocol (UDP) or the HyperText Transfer Protocol Secure (HTTPS) may also be advantageously employed.

The main memory 124 of each computer node 120 includes a plurality of memory locations addressable by the processor 122 and/or adapters for storing software code (e.g., processes and/or services) and data structures associated with the embodiments described herein. Each processor and adapter may, in turn, include processing elements and/or circuitry configured to execute the software code, such as an instance of a virtual machine and a hypervisor 125, and manipulate the data structures. The virtual machine instance (VMI) 200 is managed by the hypervisor 125, which is a virtualization platform configured to mask low-level hardware operations from one or more guest operating systems executing in the VMI 200. In an embodiment, the hypervisor 125 is illustratively the Xen hypervisor, although other types of hypervisors, such as the Hyper-V hypervisor and/or VMware ESX hypervisor, may be used in accordance with the embodiments described herein.

It will be apparent to those skilled in the art that other types of processing elements and memory, including various computer-readable media, may be used to store and execute program instructions pertaining to the embodiments described herein. Also, while the embodiments herein are described in terms of software code, processes, and computer, e.g., application, programs stored in memory, alternative embodiments also include the code, processes and programs being embodied as logic, components, and/or modules consisting of hardware, software, firmware, or combinations thereof.

Figure 2:
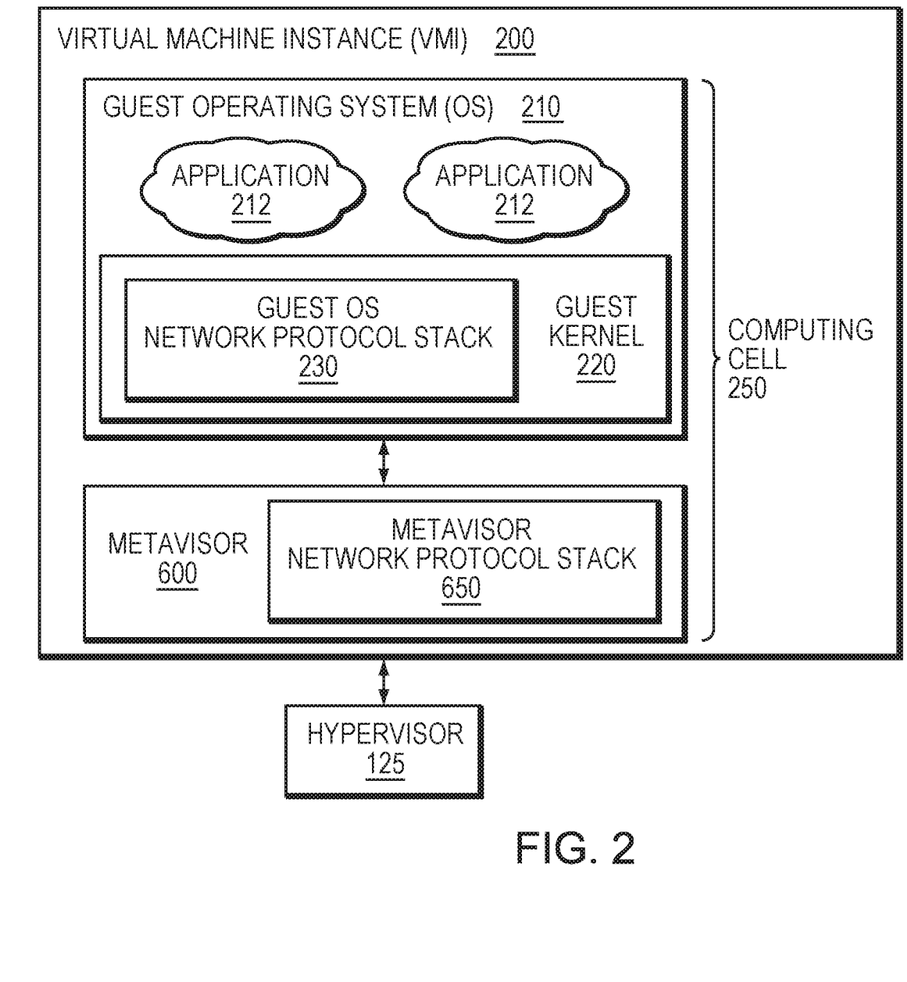
FIG. 2 is a block diagram of a virtual machine instance including a metavisor.

FIG. 2 is a block diagram of the virtual machine instance (VMI) 200. In an embodiment, guest operating system (OS) 210 and associated applications 212 may run in the VMI 200 and may be configured to utilize system (e.g., hardware) resources of the VDC 110. The guest OS 210 may be the Linux® operating system, FreeBSD® and similar operating systems; however, it should be noted that other types of guest OSs, such as the Microsoft Windows® operating system, may be used in accordance with the embodiments described herein. A guest kernel 220 of the guest OS 210 includes a guest OS network protocol stack 230 for exchanging network traffic over a network data path established by the network adapter 128 via the hypervisor 125. The guest OS may be managed, at least in part, by an intermediary manager, i.e., metavisor 600, which includes a metavisor network protocol stack 650 and logic for enhancing guest utilization of various VDC resources, such as processor 122, main memory 124, storage adapter 126, and network adapter 128, among others. The VDC resources may be virtualized for the VMI 200, at least partially with the assistance of the hypervisor 125. The hypervisor may present a software interface for processes within the VMI to communicate requests, e.g., hypercalls, directed to the hypervisor to access the VDC resources.

In one or more embodiments, the metavisor 600 and guest OS 210 are independent operating entities (OE) arranged as a computing cell 250 within the VMI 200. The computing cell 250 is illustratively a cloud workload protection platform configured to enable enterprises to run workloads securely in hybrid cloud environments using a set of security controls, policies, application and data micro-segmentation (e.g., fine grain control per computing cell), and visibility. The metavisor 600 is located at a confluence of the computing cell 250 and includes logic that enables implementation and enforcement of the security controls, policies and services for the cell 250. The computing cell 250 is layered over the hypervisor 125 which manages system (e.g., hardware) resources of the VDC. The metavisor 600 illustratively employs an advanced virtualization technique that presents itself to the guest OS 210 as the cloud hypervisor 125, and to the cloud hypervisor 125 as the guest OS 210. That is, the metavisor operates as a transparent intermediary between the guest O/S and the cloud hypervisor.

Specifically, the metavisor is located between the hypervisor 125 and guest OS 210 within the VMI 200 (i.e., the metavisor is disposed underneath the guest OS and over the hypervisor) and, as such, can "see" requests by the guest OS to access the virtualized resources of the VDC. Typically, enforcement of access between such resources employs a configuration based on network layer, e.g., internet protocol (IP), address-based tables organized as firewall rules and/or link layer configuration, e.g., groups of switch ports (not shown), organized as VLANs to apportion the computer network into segments or subnets. However, the address-based tables and/or VLANs provide coarse-grained access control and enforcement to the virtualized resources depending upon location on the network segment, i.e., a resource connected to the network segment may communicate with other resources connected to the segment. Moreover, configuration of the address-based tables/VLANs is generally static; a network administrator may be employed to create (write) the firewall rules of the tables. In addition, updates to the configuration in a dynamically changing environment may be difficult and inefficient since the tables are not human-readable or easily accessible.

The embodiments described herein are directed to a tag-based policy architecture configured to enforce IT policy in a virtualized computing environment using cryptographically-verifiable metadata to authenticate compute resources coupled to a computer network and to authorize access to protected resources of the network. The compute resources are illustratively VMIs 200 provided by a VDC 110 of the environment, whereas the protected resources are illustratively virtualized storage, network and/or other compute resources of the VDC that are protected by the tag-based policy architecture. Each VMI 200 includes an intermediary manager, e.g., a meta-hypervisor (metavisor 600), of a computing cell 250 that also includes a guest OS 210 and associated applications 212.

Figure 3:
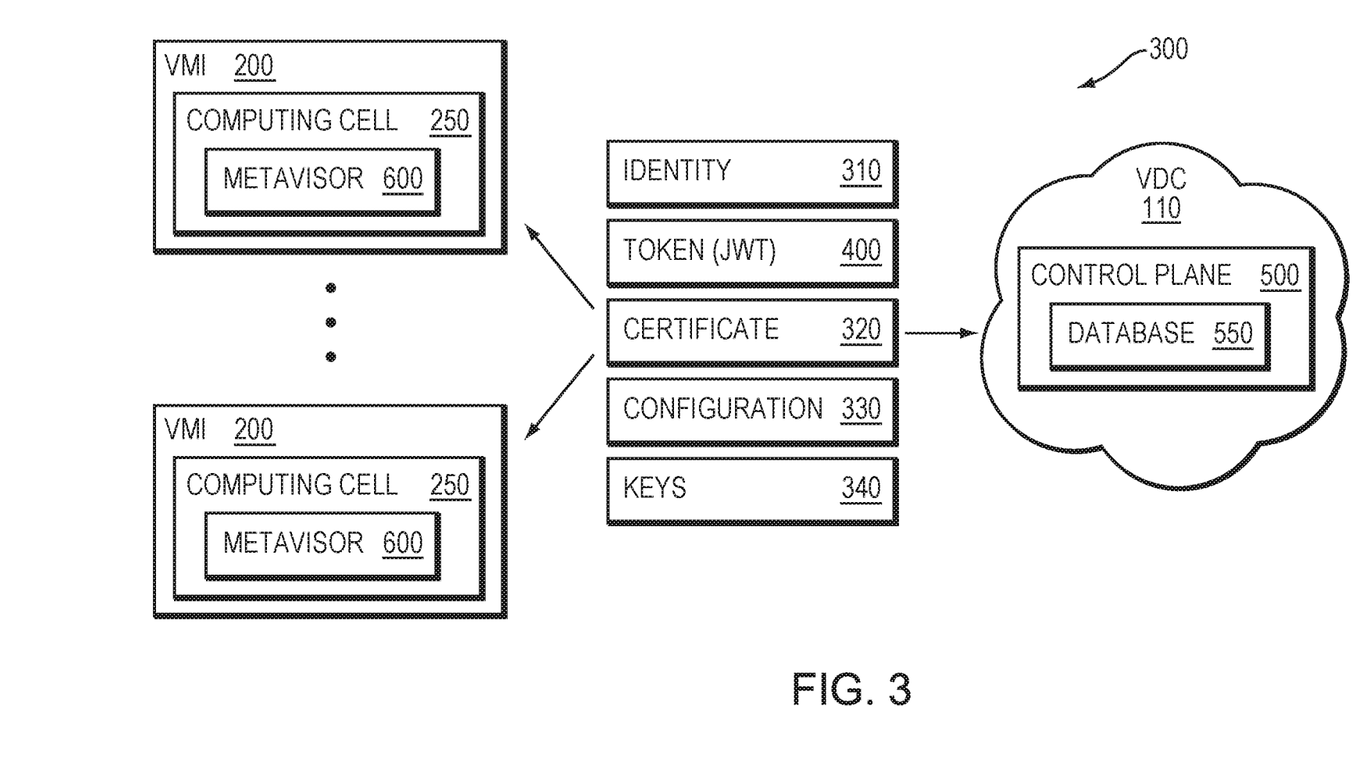
FIG. 3 is a block diagram of a tag-based policy architecture.

FIG. 3 is a block diagram of the tag-based policy architecture 300 that includes an infrastructure having a centralized policy decision endpoint (e.g., a control plane 500 of the VDC 110) and distributed policy enforcement endpoints (e.g., metavisors 600 of the VMIs 200) that use end-to-end passing of the cryptographically-verifiable metadata to (i) authorize instantiation of the VMIs 200 at the control plane 500, and (ii) enforce access to the virtualized resources at the metavisors 600. To that end, the cryptographically-verifiable metadata may be embodied as tokens 400 and identity documents 310 used to authenticate the VMIs, as well as network certificates 320, configuration 330, and keys 340 used to authorize access to the virtualized (e.g., protected) resources. As such, the virtualized resources are protected according to access restrictions of the various IT policies. Note that the cryptographically-verifiable metadata itself may be encrypted to ensure secure transmission of the keys (i.e., secrets). That is, two separate forms of cryptography may be employed: a first cypher to authenticate the metadata and second cypher to render the metadata private during transmission. In an embodiment, the second cypher may be applied via a Transport Layer Security (TLS) protocol.

The identity document 310 is illustratively a JSON file (e.g., an Amazon Web Services instance identity file) that contains metadata describing a VMI (including a metavisor) as provided by a CSP, such as a network address of the metavisor and a geographical region in which the metavisor is allowed to boot. The JSON file may be cryptographically verifiable using CSP provided keys. The metavisor sends the JSON file and a cryptographically-verifiable token 400 to the control plane for authentication, e.g., via a secure (encrypted) connection request. The network certificate 320 is issued by the control plane 500 in response to verifying the identity of a metavisor 600 of an authenticated VMI (i.e., an authenticated metavisor of the VMI) running in the VDC 110 according to the IT policy included in the token. That is, the control plane 500 renders a policy decision whether to permit the metavisor to boot by authenticating the VMI and the metavisor as well as by applying the IT policy. Note that the IT policy and decision may apply to metadata (provided by the CSP) of the JSON file, such as geographic information, a time of VMI creation, and a processor type. The network certificate illustratively contains the token 400 embedded as an extension that is used to render a distributed IT policy enforcement determination at the metavisor. Note that the control plane authenticates the VMI by verifying the JSON file using the CSP key and further authenticates the metavisor 600 by verifying the token 400. Groups of authenticated metavisors running in the VDC (peer groups) may be associated with various IT policies to form network and/or data access configuration 330 provided to each metavisor 600 of the groups.

Figure 4:
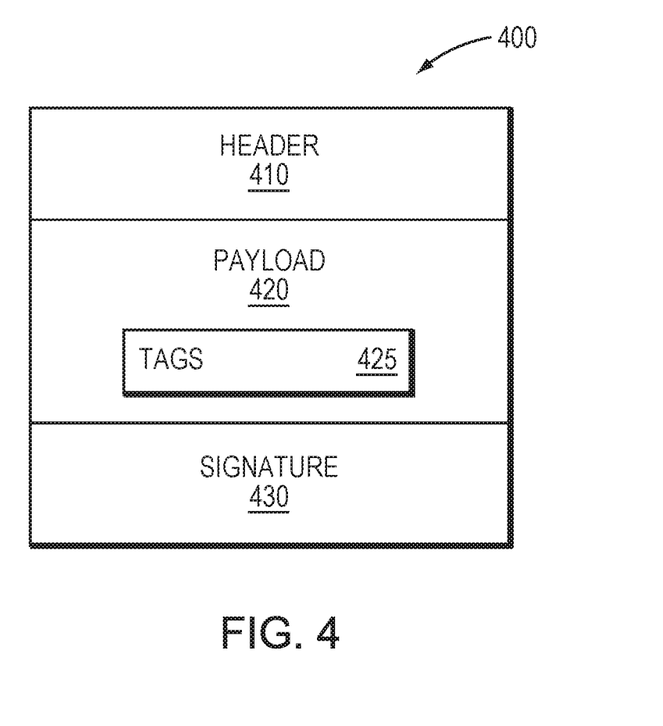
FIG. 4 is a block diagram of a token data structure.

In one or more embodiments, the token 400 is a JSON web token (JWT) data structure (according to Internet Engineering Task Force RFC 7519) that is supplied to a metavisor (i.e., an instance) upon boot. FIG. 4 is a block diagram of a JWT token 400 that includes a header 410, a payload 420, and a signature 430. The header 410 contains metadata about the token 400, such as a key identifier used for verification and a signature algorithm (e.g., an asymmetric encryption algorithm) used to sign the token. A private key of an asymmetric public/private key pair may be used to sign the JWT token 400 at the metavisor 600 and the associated public key of the key pair may be used to authenticate the JWT signature at the control plane 500, e.g., in accordance with the secure connection request. One or more arbitrary key-value pairs (i.e., tags 425) may be embedded within the payload 420 of the token 400 as one or more private claims that enable attachment of IT policy (e.g., a level of access) to a virtualized resource, such as the metavisor, or groups of virtualized resources. The signature 430 authenticates the contents of header 410 and payload 420, which may be verified by applying the signature algorithm. Notably, the JWT may be created by an administrator at the control plane.

Figure 5:
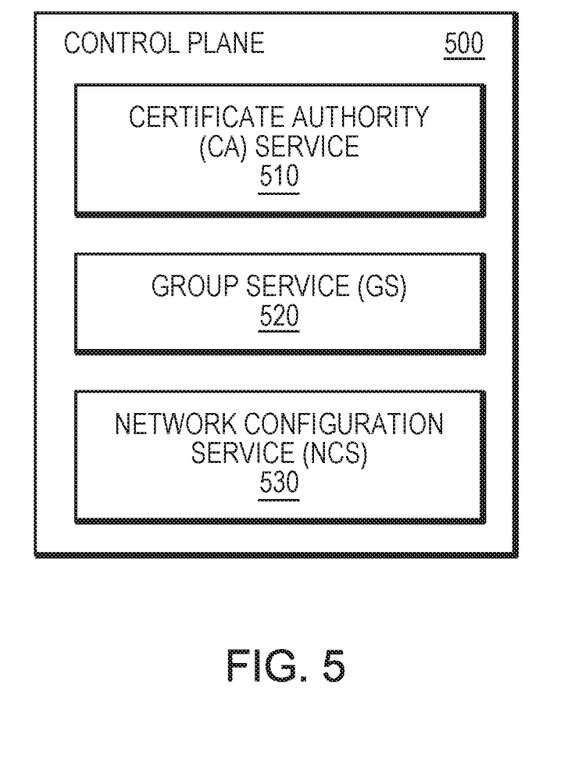
FIG. 5 is a block diagram of a control plane.

In accordance with the centralized/distributed policy infrastructure of the tag-based policy architecture 300, the control plane 500 may perform a centralized policy decision determination for the secure connection request by one or more compute resources, such as metavisors 600 and user endpoints 170, to access protected resources, and each metavisor may perform a distributed policy enforcement determination for the connection request to access the protected resources. FIG. 5 is a block diagram of the control plane 500 having various components embodied as services configured to perform the centralized policy determination, wherein the services include a certificate authority (CA) service 510, a group service (GS) 520, and a network configuration service (NCS) 530. The CA 510 is configured to receive a certificate signing request (CSR) from a metavisor 600 and, upon authentication, return a network certificate 320 to the authenticated metavisor. Accordingly, the CSR/network certificate request/reply communication provides a polling mechanism for the metavisor to obtain IT policy, e.g., via the embedded tags in the token extending the certificate. The GS 520 is configured to obtain information about authenticated metavisors running in the VDC for the purpose of establishing group memberships. The NCS 530 is responsible for supplying an authenticated metavisor with its network configuration 330.

The control plane 500 may run in an instance of a virtual machine (such as, e.g., a VMI 200) as an OE module in a memory (such as, e.g., main memory 124) and is executable by a processor (such as, e.g., processor 122) of a computer node on a network that is accessible to the metavisor 600. As such, the metavisor may be provided a network address to connect with the control plane when instantiated (launched). In one or more embodiments, residence of the control plane may be on a network segment of the VDC 110 (e.g., a CSP) or of a private customer cloud. For example, the control plane may be deployed on-premises where a customer runs the control plane locally in its own data center (on its premises), typically on a virtual machine instance (or directly on the hardware). Alternatively, the control plane 500 may be deployed as a hosted solution via a service running on a public cloud of the CSP. Access to the control plane may be achieved via standard TLS or secure sockets layer (SSL) protocols and custom client search for metavisor access. As described further herein, cryptographically-verifiable and secure control plane/metavisor interaction may illustratively use public/private key exchange.

Figure 6:
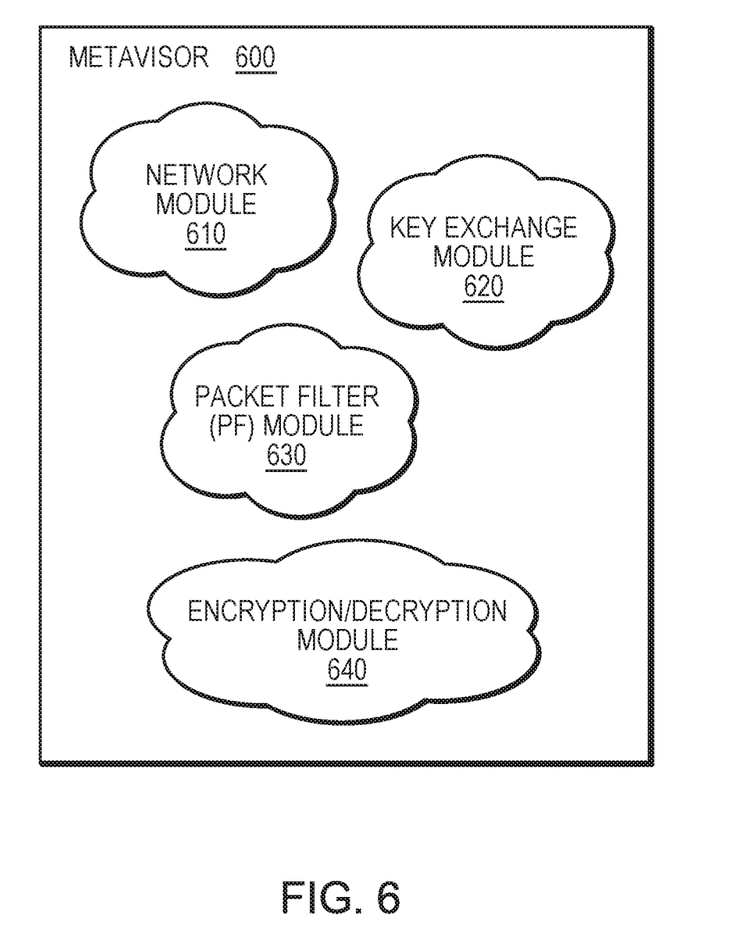
FIG. 6 is a block diagram of the metavisor.

FIG. 6 is block diagram of the metavisor 600 having various components embodied as modules configured to perform the distributed policy enforcement determination. In one or more embodiments, the metavisor 600 is implemented using the NetBSD® OS kernel, although other kernels, such as the FreeBSD® OS kernel, may also be used. Illustratively, the modules of the metavisor 600 include a network module 610, a key exchange module 620, a packet filter (PF) module 630, and an encryption/decryption module 640. The network module 610 is responsible for managing the network configuration 330 within the metavisor. The key exchange module 620 is responsible for authenticating other metavisors and establishing security associations with them for the purpose of encrypting network traffic. The PF module 630 is a kernel process configured to implement firewall functionality (e.g., iptables), whereas the encryption/decryption module 640 is responsible for encrypting and decrypting network traffic based on the IT policies. Illustratively, one or more of these modules may be configured to provide unique, special-purpose conditional tests and actions that are deployed using "hooks" in the metavisor network protocol stack 650 that are called at particular points of processing in the metavisor 600.

In one or more embodiments, the identity documents 310, cryptographically-signed JWT tokens 400 and embedded tags 425 may be used to create the various IT policies at a computer node such as, e.g., the user endpoint 170. The various IT policies, such as boot policy, data policy, and network policy (classes of policies), may then be stored in a repository (e.g., database 550) of the control plane 500. The control plane 500 evaluates (i.e., compares) the tags 425 of the authenticated JWTs 400 and the authenticated identity documents 310 with its stored IT policies to permit release of keys 340 to the metavisors for secure cryptographic operations (e.g., cryptographically secure access to data and network services). Illustratively, the released keys may be transmitted within a secure (encrypted) TLS 1.2 connection response, although such keys may alternatively be transmitted via an encrypted JWT. Access to the virtualized resources may then be enforced at the control plane 500 and metavisors 600 in accordance with the various IT policies associated with the JWT tags 425. The infrastructure of the tag-based policy architecture may be configured to provide unified policy management and visibility (e.g., feedback from policy enforcement and access to resource at the metavisors) for the classes of policy to an administrator via the control plane.

For example, boot policy may be employed at the control plane to enforce when and how a metavisor is allowed to boot in a computing cell 250 of a VMI 200. Illustratively, a policy engine may be embodied as database web application configured to store a policy as defined by an administrator interacting with the web application, wherein the stored policy is based, at least in part, on the identity document 310 and tags 425 contained in associated JWT 400. Upon boot, a metavisor 600 of a VMI 200 may issue a CSR to connect with the control plane 500 and to request a network certificate 320. Illustratively, if the VMI (metavisor) boots in a proper geographical region (according to the IT policy) and has the proper tags 425 embedded in the JWT, the control plane 500 may respond by sending a network certificate 320 to enable establishment of a secure (e.g., TLS or SSL) connection between the control plane and metavisor in order for the metavisor 600 to securely obtain a key and the network and/or data access configuration 330. Illustratively, the JWT 400 may be added as an extension to the TLS/SSL network certificate, although the JWT may alternatively be added as a header to an HTTPS request. Whenever the metavisor 600 communicates with the control plane 500 (e.g., to request a distributed policy for access to one or more resources or services), the certificate and extension (i.e., the tags embedded in the extension representing the distributed policy) are provided to the control plane, which renders a decision as to whether the request passes the centralized policy. If so, the metavisor is allowed to communicate with the service or resource. The metavisor may poll the control plane at periodic intervals to update the distributed policy. Notably, the metavisor may be configured to enforce a last policy obtained from the control plane, even if the last policy is out-of-date when communication with the control plane is lost, as well as to handle extended loss of communication response due to network outages.

Data policy may be employed at the metavisors 600 to specify the manner in which applications can access (read and/or write) data stored on the volumes 129 of the VDC 110 according to the data access configuration. The keys 340 released for this policy may include data encryption/decryption keys to enable the metavisors to encrypt (wrap/encapsulate) or decrypt (unwrap/unencapsulate) data of the volumes. Illustratively, a metavisor 600 may utilize the keys to encrypt or decrypt the volumes 129, such as a root volume, on any CSP platform to thereby obviate control of the keys and data by the platform. That is, the metavisor automates management of the keys (via interaction with the control plane) independently of the CSP platform. The released keys enable the metavisor to provide fine-grain control with respect to rendering of decisions locally as to whether, e.g., the guest OS 210 and associated applications 212 can access (i.e., read, read and write, or delete) the contents of a volume. These fine-grain control decisions are made at the metavisor as a point of enforcement.

Network policy may be employed at the metavisors 600 to control end-to-end communication between compute resources (e.g., the metavisors) using the network configuration to establish connections and/or encryption of network flows. As used herein, a network flow denotes a 5-tuple that includes source and destination IP addresses, as well as source and destination port numbers and protocol type. Evaluation of network policy at the control plane 500 may result in release of network configuration 330 (e.g., a peer group) and one or more secret keys 340 (e.g., an authentication key and/or an encryption key) to enable the metavisors to authenticate and/or encrypt connections to other peer metavisors of the group. For example, assume that a metavisor 600 sends a request to the control plane to provide a peer group to its network configuration. The control plane 500 may evaluate the JWT 400 and identity document 310 (provided by the metavisor) to generate a peer group embodied as a list of IP addresses, as well as a shared secret key. Once authenticated, the metavisor may use the list to populate ("cache") local firewall configuration (e.g., iptables) maintained at the metavisor as cached network configuration. The metavisor may then initiate authenticated connections (and optionally encrypted connections) using the network configuration and key.

As additional metavisors join/authenticate into the network, the peer group may change and each metavisor may continuously poll the control plane to dynamically obtain (pull) updates to the changed configuration. If the control plane disappears (e.g., due to a connectivity issue), the metavisors 600 can continue to operate using their locally cached network configuration, thereby obviating a centralized point of failure. That is, the distributed arrangement of the metavisors (with respect to the control plane) makes the tag-based policy architecture resilient to network connectivity issues. In one or more embodiments, the metavisors may be configured to tolerate predetermined amounts of network outages and/or the inability to connect to the control plane 500 before halting policy enforcement operation and pausing workload processing. Although the control plane should be on-line and operational to provide updates and changes to the network configuration, brief outages can be sustained at the metavisors 600 because the keys and policies associated with their cached configurations enable continued local policy enforcement during the brief outages. To avoid staleness, the locally-cached configurations may have expiration times that allow the metavisors to pull any updates from the control plane.

Specifically, the tag-based policy architecture 300 described herein advances the security side of firewall operation to include network controls, storage controls and/or compute controls that enable use of the JWT tokens 400 to render policy enforcement decisions. In essence, the PF module 630 may cooperate with the other modules of the metavisor 600 to provide a point of policy enforcement where the keys 340 are authenticated, a network flow is verified, and/or decryption is performed, e.g., to decrypt data using the authenticated keys 340 so that the data can be analyzed. The actual enforcement mechanism utilized by the modules may vary: for a data volume, the mechanism may be release of a symmetric data encryption key 340, whereas for a network flow, the mechanism may be release of a certificate 320 containing proper metadata to enable the metavisor 600 to join an encrypted peer group.

In addition, the JWTs 400 and network configuration 330 may be employed to apportion the computer network into segments, i.e., network segmentation, so as to enable fine-grained access control by the metavisors 600 over the virtualized resources in a dynamically distributed manner. Instead of a large classless inter-domain routing (CIDR) address block that enables computing resources to access resources based on connection to a VLAN or network segment, the JWTs 400 and network configuration 330 enable the firewall functionality of the PF module 630 to populate its firewall rules (e.g., iptables configuration) with fine-grained IP addresses that enable direct access to tagged resources. For example, a network configuration 330 may specify a network policy that allows a compute resource associated with (attached to) a key-value pair "app:web" to connect to (i.e., communicate or access) another compute resource attached to a key-value pair "app:db" as defined by the tags 425 of JWT 400. Such tagging allows effective network segmentation on any CSP platform because the JWT 400 is generic, and the control plane 500 (and metavisors) can authenticate resources using the tags 425. That is, network segmentation may be effectively enforced and dynamically defined using the tags in a generic JWT. Thus, a resource may be launched and tagged with an IT policy embedded in a JWT token to safely iterate in a segmented network without having to define that policy in a coarse-grained firewall rule based on IP addresses. The metavisor may process the tag-based JWT token in any CSP to allow or disallow access to the resource.

Further, access to resources across varying classes of IT policy may be detected, such as when a VMI gains access to restricted data via a less restrictive network policy, wherein the restricted data was sought to be adequately protected by data policy alone. For example, consider a first VMI that is granted access to restricted PCI data (e.g., medical history) via a data policy that prevents access to such restricted data by a second VMI. However, if a network policy allows the second VMI to connect to the first VMI, the restricted data may leak from the first VMI to the second VMI despite the access prohibition specified by the data policy. That is access to resources (e.g., PCI data) may occur across classes of IT policies, so that visibility within each class of IT policy is insufficient to ensure overall security. Illustratively, the unified management and visibility feature of the tag-based policy architecture across and between policy classes permits detection of policy conflicts, such as unintended data access between different classes of policies, that may otherwise go undetected.

Another feature of the tag-based policy architecture is that the infrastructure may be used to control access to computing resources independent of those resources being aware of the prevailing IT policy. For example, the guest OS 210 and associated applications 212 of a computing cell 250 may be unaware of a policy that restricts access to certain tagged resources. The infrastructure leverages the fact that the metavisor 600 of the computing cell is both in the network path and the storage (data) path to make policy decisions that it (i) obtains/acquires from the control plane and (ii) stores and enforces locally. In an embodiment, metavisor enforcement and access to resources may be logged and provided as feedback to the control plane. As noted, the control plane 500 organizes information about the metavisors into a data access and/or network configuration. In response to a request (e.g., poll) from the metavisor, the control plane provides the configuration (based on the tags/policy) which the metavisor uses to enforce access to data, key release to unwrap encrypted data, and/or network connections. As for the latter, the metavisor may block an attempted network connection by the guest OS (or application) to a resource for which it is not approved in the configuration, e.g., associated with a tag denying access.

Since the metavisor resides on the data path, storage resources, such as volumes 129, may be tagged for data policy (similar to tagging of compute resources for network policy). Assume an application 212 is PCI-compliant, such that volumes 129 are tagged with "PCI" using the tags 425 of the JWT token 400 so as to permit access via a PCI bus of the VMI. The data policy (as specified by the data access configuration 330) allows any application tagged "PCI" to read (and optionally write) PCI data of the volumes 129. Such data policy provides fine-grained read/write control based on embedded policy tags 425 of the JWT in conjunction with the control plane 500 providing the data access configuration 330 to the metavisor 600 and releasing the keys 340 needed to decrypt (and optionally encrypt) the data of the volumes. The metavisor thereafter enforces the data access configuration 330 including use of the keys 340 when appropriate.

Figure 7:
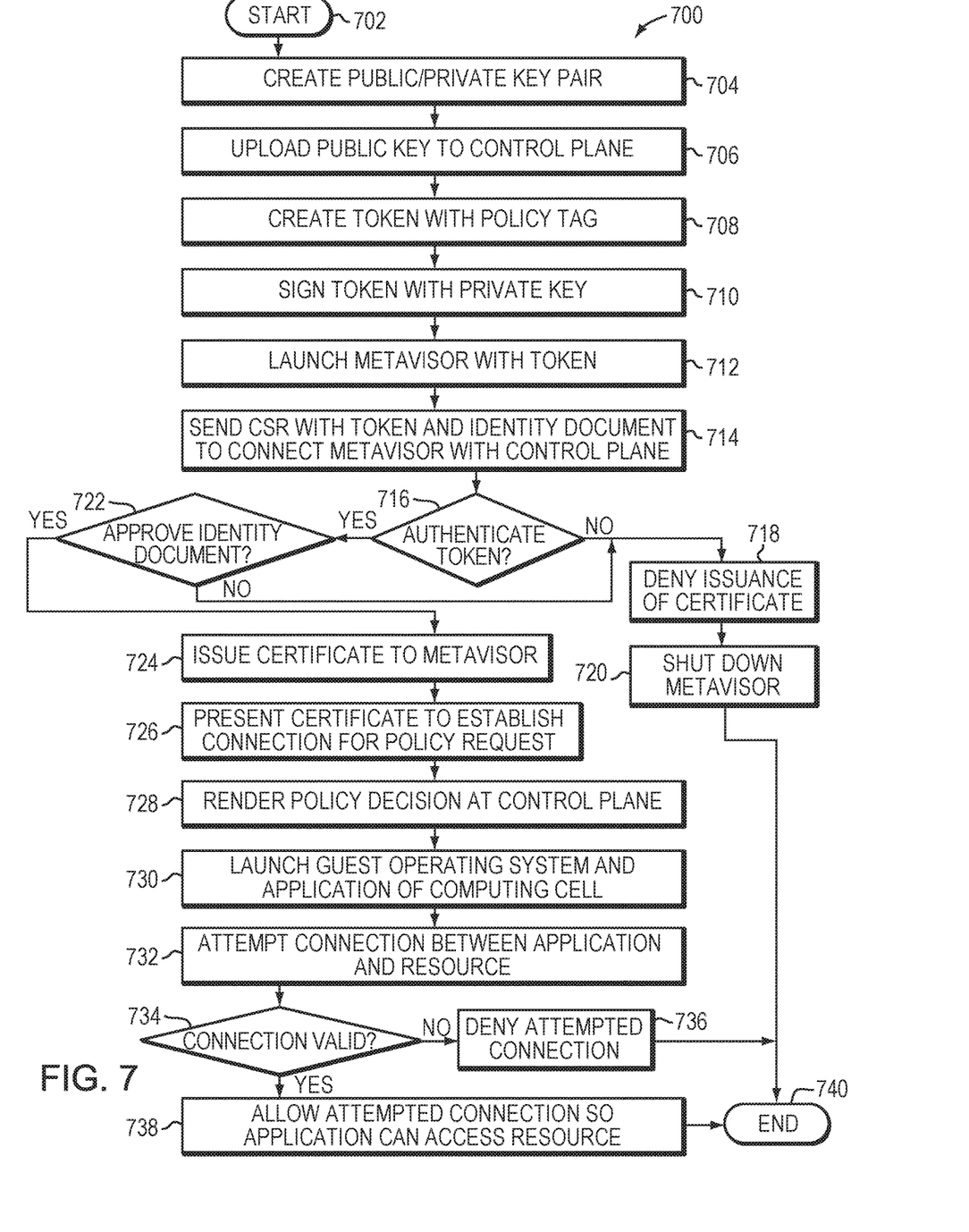
FIG. 7 is an example simplified procedure for authorizing and enforcing access to resources of a virtualized computing environment.

FIG. 7 is an example simplified procedure for authorizing and enforcing access to resources of a virtualized computing environment. The procedure 700 starts at box 702 and proceeds to box 704 where a developer (e.g., administrator) creates a public/private key pair and, at box 706, forwards (uploads) the public key to the control plane. At box 708, the administrator creates a JWT token embedded with one or more policy tags and, at box 710, signs the token with its private key. At box 712, the administrator boots (launches) a metavisor instance of the computing cell with the JWT token. At box 714, the metavisor sends a CSR with the token and instance metadata, such as an identity document from the CSP, to connect with the control plane in accordance with the OIDC protocol. Note that the identity document includes metadata about the metavisor instance, such as the geographical (e.g., US, European) region in which the instance is allowed to run, the IP address of the instance, etc. At decision box 716, the control plane determines whether it can verify authentication of the JWT token using the public key of the key pair. If it cannot authenticate the token, the control plane denies issuance of a certificate to the metavisor at box 718, and the metavisor shuts down (error) at box 720 (e.g., denying launch of the guest O/S). The procedure then ends at box 740. If it authenticates the token (decision box 716), the control plane evaluates the identity document for approval at decision box 722 based, e.g., on the metadata of the authenticated JWT, as well as whether a data residency requirement of boot policy is satisfied. If it cannot approve the identity document, the control plane denies issuance of the certificate to the metavisor at box 718 and the metavisor shuts down at box 720.

For example, if the administrator attempts to launch a European-only authorized application in a US data center, the control plane may deny the certificate and launching attempt, and the metavisor shuts down. In addition, assume the administrator generates a copy of an encrypted volume during testing in an authorized region (e.g., US) and forwards the copied volume to a node in a different, unauthorized region (e.g., India). Typically, data residency requirements are IP-based, wherein an entire country/region IP address range may be blocked and denied access to data stored on a volume using, e.g., a conventional firewall. If the data is copied to another country/region in violation of the data residency requirement, the firewall may be security compromised and the data may be leaked. However, the tag-based policy architecture infrastructure described herein obviates such data leak because, without the key to enable access to the encrypted volume, the data of the copied volume cannot be accessed. When a metavisor is subsequently booted and launched to access the copied data, the control plane evaluates the identify document of the metavisor (i.e., VMI) and determines that the metavisor is located in an unauthorized region for the stated policy (i.e., data can only be accessed in the US region) and does not release the key needed to decrypt the data so that it can be accessed/read. The tags of the data/volume and the instance (as well as the identity document for the instance) are used to evaluate the policy to determine whether the instance is allowed to obtain the key. Since the region in which the instance is running does not match the policy, the control plane does not release the key.

If it approves evaluation of the identity document (decision box 722), the control plane issues a certificate to the (authenticated) metavisor at box 724, wherein the JWT token is embedded as an extension on the certificate. For subsequent policy access requests, the metavisor presents the certificate to the control plane to establish a connection, e.g., TLS connection, at box 726 and, at box 728, the control plane uses the embedded JWT extension to render a (centralized) policy decision for the policy request of the metavisor, i.e., request by the metavisor to obtain the distributed policy. For network policy where the metavisor requests a peer group, the control plane uses the embedded tag of the token to determine the resources to which the metavisor can connect/communicate based on the policy associated with the tag that is launched with the metavisor. As noted, the policy may be manifested as a list of IP addresses and an authentication secret key (and optionally an encryption secret key) provided to the metavisor. The IP addresses are addresses of resources (including other authenticated metavisors) running in the metavisor's environment and, optionally, VPN gateways that the metavisor may need to connect with for, e.g., an on-premises instance or to exit the environment to make an external connection.

At box 730, the guest OS and applications, e.g., a web application, of the computing cell are allowed to launch. At box 732, the web application attempts to make a network connection to a resource having, e.g., a uniform resource locator that resolves to a specific port of an IP address. The metavisor analyzes the network connection attempt by, e.g., checking its cached list of IP addresses (and ports) in its network configuration (e.g., iptables configuration) to determine if the attempted connection is valid (decision box 734). If the connection is invalid, the attempted connection is denied at box 736 and the procedure ends at box 740. If the connection is valid, the attempted connection is allowed so that the application can access the resource at box 738. Notably, the application is unaware of the metavisor rendering the denial or allowance of the connection. Moreover, enforcement of the policy associated with the metavisor (computing cell) occurs without involvement of the administrator, e.g., the administrator does not need to be concerned about network segments (VLANs) or accidental access to certain resources connected to those segments. The procedure then ends at box 740.

While there have been shown and described illustrative embodiments of a tag-based policy architecture configured to enforce security policy in a virtualized computing environment using cryptographically-verifiable metadata to authenticate computing resources and authorize access to protected resources coupled to a computer network, it is to be understood that various other adaptations and modifications may be made within the spirit and scope of the embodiments herein. For example, embodiments have been shown and described herein with relation to the control plane 500 operating as a central arbiter of policy decisions and the metavisors 600 operating as distributed points of enforcement in the environment. However, the embodiments in their broader sense are not so limited, and may, in fact, allow flexibility in the architecture as to where policy is actually decided and enforced. As described herein, cryptographic key release is used as a generic method of policy enforcement, i.e., the control plane decides whether a metavisor has the right (i.e., is authorized) to receive a key. Yet, the actual enforcement point may be (i) the control plane via a key release decision or (ii) the data path of the metavisor in a dynamic, runtime decision (e.g., according to firewall rules). The tag-based policy architecture thus provides various enforcement points with a common theme that the JWT token infrastructure provides a strong model for obtaining metadata from a user (e.g., administrator) and applying the metadata in a distributed policy enforcement arrangement, as described herein.

Advantageously, the tag-based policy architecture 300 combines centralized policy decision (control plane) and distributed policy enforcement (metavisor) features to provide (i) end-to-end passing of metadata (for control) and (ii) network segmentation (for peer groups) for protecting resources accessible on the network independent of a network infrastructure of the cloud service provider (CSP), particularly for network-centric (e.g., NAS) storage, wherein the physical path to local storage resources appears differently through, e.g., PCI or SATA connections. That is, the tag-based policy architecture operates without knowledge of or restriction to a particular network infrastructure of the CSP. Unlike prior approaches that enforce access among resources that rely on network infrastructure (e.g., network layer and link layer infrastructure such as switches, routers, firewalls and the like) by apportioning the computer network into segments or subnets, the tag-based policy architecture 300 enforces access to protected resources independent of the network infrastructure at the nodes themselves that request access to the resources. This substantially enhances flexibility of node deployment within a data center and across CSPs, because enforcement of access to resources is self-contained within tag-based policy architecture independent (free) of network infrastructure. This allows the compute resources (metavisors) to access the protected resources without specific configuration of the network infrastructure, thus improving the computing environment through unrestricted node deployment and accessibility of the protected resources, such as migration of the resources without reconfiguration of the network infrastructure even across CSPs having significantly differing network infrastructures. Further, the unified management and visibility feature of the tag-based architecture across and between policy classes permits detection of policy conflicts, such as unintended data access between different classes of policies, that may otherwise go undetected.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software encoded on a tangible (non-transitory) computer-readable medium (e.g., disks and/or electronic memory) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system comprising:
a first computing device comprising at least one processor, the first computing device configured to run a hypervisor, a virtual machine comprising a guest operating system, and a metavisor, wherein the metavisor is configured to operate as an intermediary between the guest operating system and the hypervisor and authorize access by the guest operating system to a protected resource;
a second computing device comprising at least one processor, the second computing device configured to run a control plane configured to:
receive a request from the metavisor for at least one key for accessing the protected resource, the request comprising an identity document and a token having a tag associated with a policy, the identity document comprising metadata corresponding to the metavisor;
determine whether the metavisor is allowed to obtain the at least one key and authorize access by the guest operating system to the protected resource based on the policy and the identity document; and
when the control plane determines the metavisor is allowed to obtain the at least one key, transmit a response to the metavisor, the response comprising the at least one key.

2. The system of claim 1, wherein the metadata corresponding to the metavisor comprises at least one of a network address of the metavisor or a geographical region in which the metavisor is allowed to boot.

3. The system of claim 1, wherein the response comprises the token embedded as an extension.

4. The system of claim 1, wherein the token comprises a data structure supplied to the metavisor upon boot and includes a header, a payload, and a signature configured to verify contents of the header and payload.

5. The system of claim 4, wherein the payload contains at least one key-value pair that enables attachment of the policy associated with the protected resource.

6. The system of claim 5, wherein the key-value pair is the tag.

7. The system of claim 1, wherein the policy comprises a boot policy employed at the control plane to enforce when and how the metavisor is allowed to boot in the first computing device.

8. The system of claim 1, wherein the policy comprises a data policy employed at the metavisor to specify a manner in which an application of the virtual machine accesses data according to a data access configuration.

9. The system of claim 1, wherein the policy comprises a network policy employed at the metavisor to control end-to-end communication with the protected resource using network configuration to establish a connection.

10. A method for authorizing access by a guest operating system to a protected resource, wherein a first computing device comprises at least one processor, the first computing device configured to run a hypervisor, a virtual machine comprising the guest operating system, and a metavisor, wherein the metavisor is configured to operate as an intermediary between the guest operating system and the hypervisor and authorize access by the guest operating system to the protected resource, and wherein a second computing device comprises at least one processor, the second computing device configured to run a control plane configured to perform the method comprising:
  receiving a request from the metavisor for at least one key for accessing the protected resource, the request comprising an identity document and a token having a tag associated with a policy, the identity document comprising metadata corresponding to the metavisor;
  determining whether the metavisor is allowed to obtain the at least one key and authorize access by the guest operating system to the protected resource based on the policy and the identity document; and
  when the control plane determines the metavisor is allowed to obtain the at least one key, transmitting a response to the metavisor, the response comprising the at least one key.

11. The method of claim 10, wherein the policy comprises a boot policy employed at the control plane to enforce when and how the metavisor is allowed to boot in the first computing device.

12. The method of claim 10, wherein the policy comprises a data policy employed at the metavisor to specify a manner in which an application of the virtual machine accesses data according to a data access configuration.

13. The method of claim 10, wherein the policy comprises a network policy employed at the metavisor to control end-to-end communication with the protected resource using network configuration to establish a connection.

14. The method of claim 13, wherein the network configuration is a list of network addresses of authenticated metavisors.

15. A non-transitory computer readable media containing instructions that when executed execution on by at least one processor of a second computing device, cause the at least one processor of the second computing device to perform a method for authorizing access by a guest operating system to a protected resource, wherein a first computing device comprises at least one processor, the first computing device configured to run a hypervisor, a virtual machine comprising the guest operating system, and a metavisor, wherein the metavisor is configured to operate as an intermediary between the guest operating system and the hypervisor and authorize access by the guest operating system to the protected resource, the method comprising:
  receiving a request from the metavisor for at least one key for accessing the protected resource, the request comprising an identity document and a token having a tag associated with a policy, the identity document comprising metadata corresponding to the metavisor;
  determining whether the metavisor is allowed to obtain the at least one key and authorize access by the guest operating system to the protected resource based on the policy and the identity document; and
  when it is determined the metavisor is allowed to obtain the at least one key, transmitting a response to the metavisor, the response comprising the at least one key.

16. The non-transitory computer readable media of claim 15, wherein the metadata corresponding to the metavisor comprises at least one of a network address of the metavisor or a geographical region in which the metavisor is allowed to boot.

17. The non-transitory computer readable media of claim 15, wherein the response comprises the token embedded as an extension.

18. The non-transitory computer readable media of claim 15, wherein the token comprises a data structure supplied to the metavisor upon boot and includes a header, a payload, and a signature configured to verify contents of the header and payload.

19. The non-transitory computer readable media of claim 15, wherein the policy comprises a data policy employed at the metavisor to specify a manner in which an application of the virtual machine accesses data according to a data access configuration.

20. The non-transitory computer readable media of claim 15, wherein the policy comprises a network policy employed at the metavisor to control end-to-end communication with the protected resource using network configuration to establish a connection.

* * * * *